Patented Feb. 15, 1927.

1,617,927

UNITED STATES PATENT OFFICE.

OSCAR A. TANNER, OF VERONA, PENNSYLVANIA, ASSIGNOR TO ARTSTONE BURIAL VAULT CO., INC., A CORPORATION OF DELAWARE.

PROCESS OF MANUFACTURING ARTIFICIAL STONE.

No Drawing.    Application filed July 25, 1925. Serial No. 46,162.

My invention relates to an improved process for manufacturing artificial stone primarily intended for use in structures exposed to excessive moisture, namely mausoleums, septic tanks, etc., but it is to be understood that my improved artificial stone may be employed for any other purposes wherein it is found to be applicable.

Important objects of this invention is to provide an artificial stone which is impervious to moisture, not affected by acids, and comparatively inexpensive to manufacture.

My improved artificial stone is composed of the following ingredients, and proportions: Fire clay, thirty parts; silica, thirty parts; brimstone, thirty parts; plumbago, five parts; and talc, five parts. It will, of course, be obvious that the proportions of the ingredients may be varied to some extent, but the proportions above enumerated have been found by experimentation to be best to meet the usual conditions found in practice.

The composition is compounded by fusing the brimstone, in a suitable vessel, by heating the brimstone to maintain a temperature of approximately four hundred and fifty degrees Fahrenheit. The talc, plumbago, fire clay and silica are then added to the fused brimstone in the order named. Each of the ingredients is thoroughly mixed with the mass before the subsequent ingredient is added. The compounded mass is then allowed to cool to a temperature approximately three hundred degrees Fahrenheit, at which temperature the mass is maintained at the proper molding consistency.

My improved artificial stone is absolutely impervious to moisture, is not affected by acids, and may readily be jointed or sealed.

What I claim is:

The process of producing artificial stone by the composition of thirty parts of fire clay, thirty parts of silica, thirty parts of brimstone, five parts of plumbago and five parts of talc.

In testimony whereof I affix my signature.

OSCAR A. TANNER.